Patented Mar. 18, 1941

2,235,447

UNITED STATES PATENT OFFICE 2,235,447

ESTER CONDENSATION PRODUCTS AND METHOD OF PRODUCING THE SAME

Theodore F. Bradley, Stamford, and William B. Johnston, Springdale, Conn., assignors to American Cyanamid Company, New York, N. Y., a corporation of Maine No Drawing. Application June 24, 1938,
Serial No. 215,584

11 Claims. (Cl. 260—75)

This invention relates to mixed esters and to methods of producing the same. It is particularly concerned with esters which may be described as esters of non-conjugated terpene-fumaric acid complexes, and methods of producing the same.

It is known that maleic anhydride will react with both conjugated and with non-conjugated terpenes upon heating mixtures thereof at temperatures variously ranging from 40° C. to 220° C. Such reactions generally result in the production of various unsaturated dibasic acid anhydrides of liquid, or less frequently crystalline or amorphous solid forms, together with lesser amounts of more complex resinous acid anhydrides of higher molecular weight and of higher degrees of polybasicity. In the production of these acid anhydrides according to the usual processes we have found that the ratio of dibasic to the more polybasic fractions will vary according to the constitution and proportion of the terpene fractions employed and according to the reaction conditions, especially the temperature.

While some of the complex mixtures of acid anhydrides of this maleic-terpene prior art have been esterified for the production of alkyd resins and other esters, their use for many purposes, is somewhat limited because of their inherent defects. We have found, for example, that at elevated temperatures, including the range in which alkyd poly-esters are normally prepared, certain of these acid anhydrides undergo decomposition, frequently with loss of carbon dioxide and other volatile matter and in some cases with more drastic decomposition into volatile hydrocarbons and succinic anhydride.

It has been suggested that certain of these objections may be overcome by the fractional vacuum distillation of the mixture of complex acid anhydrides of these terpene-maleic anhydride reactions, during which the dibasic constituents are isolated and may thereafter be separately esterified. This necessarily creates a large amount of by-product for which some disposition must be found and increases the cost of the desired product to a substantial extent.

In the various processes described for the production of reaction products of non-conjugated terpenes and maleic anhydride by heating mixtures of the same, it has frequently been stated that fumaric acid may be substituted for the maleic anhydride and equivalent results obtained. We have found the contrary to be true. We have found that mixtures of fumaric acid and non-conjugated terpenes are substantially unreactive throughout the suggested temperature ranges. Using suggested reaction conditions, even for long periods of time, we have found that fumaric acid does not combine chemically with non-conjugated terpenes such as alpha and beta pinenes, limonene, dipentene and terpinolene. In some cases where commercial grades of the non-conjugated terpenes were used, reaction to the extent of 10 per cent or less may be obtained but in such instances the slight reaction is due to the presence of small amounts of conjugated terpenes and possible other impurities. Where these impurities are previously removed as by pretreatment with a small amount of maleic anhydride, the same lack of reaction with fumaric acid is observed. In other words we have found that fumaric acid does not react with the non-conjugated terpenes under the conditions described as suitable for maleic anhydride and alleged to be suitable for fumaric acid.

These statements of the equivalency of fumaric and maleic acids are apparently based on the assumption that fumaric acid is allegedly converted to maleic anhydride at elevated temperatures. However, we have found that upon heating fumaric acid for eleven hours at 200° C., no detectable amount of maleic acid or anhydride is formed. Likewise upon heating fumaric acid at 250° C. for eleven hours, the fumaric acid is partially decomposed with evolution of carbon dioxide and less than 0.25 per cent of maleic acid is formed. Since these temperatures are above those generally suggested for reaction with the terpenes, the alleged rearrangement of fumaric acid to maleic anhydride or maleic acid cannot be substantiated.

Maleic anhydride reacts exothermically with conjugated terpenes and these reactions may be brought about at temperatures even below 100° C. Maleic anhydride combines quickly and readily with non-conjugated terpenes at the reflux temperature of 170–180° C. The results obtained when fumaric acid is heated with terpenes, are quite different. Fumaric acid will combine slowly with conjugated terpenes such as laevo alpha phellandrene or Δ 3, 8 (9) paramethadiene by refluxing mixtures of the same at 170–190° C. for several hours. The resulting products are resinous acids differing in many respects from the corresponding maleic anhydride reaction products.

One of the objects of the present invention is to provide a means whereby the inactivity of fumaric acid toward the non-conjugated terpene hydrocarbons may be overcome and thus an entirely new and useful series of derivatives made available for industrial purposes.

It is another object of the present invention to provide a process by which the materials employed may be readily and efficiently reacted to produce directly an alkyd-poly-ester mixture relatively free from undesirable polybasic components.

These and other objects are attained by causing the fumaric acid to combine chemically with non-conjugated terpenes of the $C_{10}H_{16}$ series, using various solubilizing and reactive alcohols to produce esters of complex organic acids which are formed during reactions that apparently involve the unsaturation of both the terpene and the fumaric acid and are produced solely as esterified derivatives by our methods as hereinafter described. We have found that if fumaric acid be admixed with a suitable alcohol and one or more non-conjugated terpenes of the $C_{10}H_{16}$ group and the mixture be caused to react simultaneously, there results chemical interaction of the fumaric acid, and alcohol, and esters of relatively low acid number are formed in high yields without objectionable side reactions or decompositions.

The principles and practice of our invention will be more clearly understood by reference to the examples given by way of illustration and not in limitation. In each of the following examples the stipulated amounts of non-conjugated terpenes, alcohols and fumaric acid are placed in a suitable reaction vessel, said vessel being equipped with an efficient mechanical agitating device, a thermometer well and a side arm to which is attached a reflux condenser and a water trap. Mechanical agitation is commenced in each case shortly after heating is begun and catalysts are introduced at this point in those examples where catalysts are employed. The temperature of each reaction mixture is held continuously at the reflux point so that the excess of unreacted terpene and the water of esterification are distilled together, condensed and separated, and the separated terpene is returned to the reaction mixture. In general, the reaction mixture is heated to about 170° C. and is then gradually increased to from 180° C. to 210° C.

The exact temperatures used in each specific case, however, is initially subject to the boiling points of the reacting materials and gradually increases as the water of esterification is eliminated. In all cases the reaction mixtures are best refluxed until substantially all water evolution has ceased. Following this, the excess or unreacted terpene is removed under reduced pressure and the resulting esters are recovered for subsequent use.

*Example 1*

| | Parts by weight |
|---|---|
| Dipentene | 200 |
| Fumaric acid | 155 |
| Tri-ethylene glycol | 200 |

Reaction of this mixture under the general conditions as described, for a period of 9 hours in which the temperature of the reaction mixture averages 180° C. results in the recovery of 45 parts by weight of aqueous distillate, 118 parts by weight of uncombined terpene and about 392 parts by weight of a viscous, balsam-like poly-ester having an acid number of 40.

*Example 2*

| | Parts by weight |
|---|---|
| Dipentene | 400 |
| Fumaric acid | 77.5 |
| Tri-ethylene glycol | 100 |

Under the aforesaid conditions, after a reflux period of 6½ hours, there is obtained 21.3 parts of aqueous distillate, 329 parts of uncombined terpene and about 227 parts of a viscous, balsam-like poly-ester having an acid number of 35.6.

*Example 3*

| | Parts by weight |
|---|---|
| Dipentene | 200 |
| Fumaric acid | 155 |
| Tri-ethylene glycol | 200 |
| Stannic chloride | 5 |

This mixture (corresponding to Example 1 except for the added catalyst) is found to react more vigorously so that during refluxing, the temperature rises to 200° C. and in two hours there are obtained 47.5 parts of aqueous distillate, 69 parts uncombined terpene and about 443 parts of a viscous, balsam-like poly-ester having an acid number of 24.6.

*Example 4*

Repetition of Example 3 using 5 parts of anhydrous zinc chloride in place of stannic chloride yields, after refluxing for four hours at 180–200° C., 45 parts of aqueous distillate, 52 parts of uncombined terpene and about 463 parts of a viscous poly-ester having an acid number of 48. Aluminum and ferric chlorides, zinc bromide zinc iodide are all found to act as catalysts under comparable conditions.

*Example 5*

Repetition of Example 3 using 5 parts of iodine in place of stannic chloride yields, after refluxing for four hours at 180–210° C., 45 parts of aqueous distillate, 54 parts of uncombined terpene and about 461 parts of a balsam-like poly-ester having an acid number of 55.2.

*Example 6*

| | Parts by weight |
|---|---|
| Dipentene | 300 |
| Fumaric acid | 155 |
| Tri-ethylene glycol | 200 |
| Iodine | 5 |

After five hours refluxing at 180–200° C. there are obtained from this reaction 45 parts of aqueous distillate, 116 parts of uncombined terpene and about 499 parts of a balsam-like poly-ester having an acid number of 61.5.

*Example 7*

| | Parts by weight |
|---|---|
| Dipentene | 250 |
| Fumaric acid | 78 |
| Tri-ethylene glycol | 100 |
| Glycerol | 11 |
| Linseed fatty acids | 93 |
| Stannic chloride | 1.2 |

After six hours of refluxing at 180–190° C. there are recovered 33 parts of aqueous distillate, 162 parts of uncombined terpene and about 338 parts of an oxygen-convertible, balsam-like poly-ester having an acid number of 18.

*Example 8*

| | Parts by weight |
|---|---|
| Dipentene | 125 |
| Fumaric acid | 78 |
| Tri-ethylene glycol | 100 |
| Linseed oil | 98 |
| Stannic chloride | 1.2 |

After 5½ hours of refluxing while the temperature is gradually raised from 170° C. to a maximum of 230° C., there are obtained 24 parts of aqueous distillate, 33 parts of uncombined terpene and about 345 parts of an oxygen-convertible, balsam-like poly-ester having an acid number of 9.8.

Example 9

| | Parts by weight |
|---|---|
| Dipentene | 182 |
| Fumaric acid | 116 |
| Ethylene glycol | 62 |
| Linseed oil | 147 |
| Stannic chloride | 1.8 |

After 3½ hours of refluxing while the temperature is raised to a maximum of 210° C. there are obtained 39 parts of aqueous distillate, 74 parts of uncombined terpene and about 395 parts of a plastic, oxygen-convertible resin having an acid number of 25.8.

Example 10

| | Parts by weight |
|---|---|
| Dipentene | 125 |
| Fumaric acid | 78 |
| Ethylene glycol | 42 |
| Stannic chloride | 1.2 |

After 5 hours of refluxing during which the temperature reaches a maximum of 195° C. there are obtained 27 parts of aqueous distillate, 46 parts of uncombined terpenes and about 173 parts of a hard resin having an acid number of 64.2.

Example 11

| | Parts |
|---|---|
| Dipentene | 100 |
| Glycerol alpha mono phenyl ether | 47 |
| Fumaric acid | 33 |
| Stannic chloride | 0.5 |

After 5½ hours refluxing at 180-190° C. there are obtained 9.5 parts of aqueous distillate, 76 parts of uncombined terpene and about 95 parts of a hard resin having an acid number of 47.4.

Example 12

| | Parts by weight |
|---|---|
| Dipentene | 100 |
| Glycerol alpha mono methyl ether | 53 |
| Fumaric acid | 58 |
| Stannic chloride | 1 |

After 3½ hours refluxing at 180-190° C. there are obtained 25 parts of aqueous distillate, 57 parts of uncombined terpene and about 130 parts of a hard ester resin.

Example 13

| | Parts by weight |
|---|---|
| Alpha pinene | 150 |
| Tri-ethylene glycol | 100 |
| Fumaric acid | 78 |

After 5½ hours refluxing at 160-169° C. there are obtained 22 parts of aqueous distillate, 105 parts of uncombined terpene and about 201 parts of a viscous balsam-like product having an acid number of 49.

Example 14

| | Parts by weight |
|---|---|
| Alpha pinene | 150 |
| Tri-ethylene glycol | 100 |
| Fumaric acid | 78 |
| Stannic chloride | 1.2 |

After 3 hours refluxing at 180-200° C. there are obtained 24 parts of aqueous distillate, 28 parts of uncombined terpene and about 277 parts of a viscous balsam having an acid number of 53.1.

This product is found to be convertible to an infusible varnish-like film when its solutions in the monoethyl ether of ethylene glycol (Cellosolve) are applied to metal and stoved at 140 C. for ¾ hour. The hardness of these films is considerably increased when the solutions are admixed with small amounts of cobalt naphthenate.

Example 15

| | Parts by weight |
|---|---|
| Commercial octadecanediol containing 10-15% stearyl alcohol | 158 |
| Fumaric acid | 58 |
| Alpha pinene | 100 |
| Stannic chloride | 1 |

After 8½ hours refluxing at 176-210° C. there are obtained 16 parts of aqueous distillate, 51 parts of uncombined terpene and about 250 parts of a balsam having an acid number of 12.8.

Example 16

| | Parts by weight |
|---|---|
| Alpha pinene | 125 |
| Amyl alcohol ("Pentasol") | 250 |
| Fumaric acid | 78 |
| Stannic chloride | 3 |

After 12½ hours of refluxing beginning at 125° C. and ending at 210° C. there are recovered 25 parts of aqueous distillate and 159 parts of a mixture of unreacted alcohol and terpene. The residual product from this distillation is fractionated at 2 millimeters of mercury pressure and 243 parts yield products of the following boiling range:

1. 17 parts = 7.0% boiling at less than 130° C.
2. 85 parts = 35.0% boiling at 130° C. to 180° C.
3. 108 parts = 44.4% boiling at 180° C. to 190° C.
4. 35 parts = 13.6% liquid residue.

Total.. 243 parts = 100.0%

Upon neutralization and repeated fractionation there are obtained from these original fractions, liquid esters as follows:

| Fraction | Boiling range at 1 mm. | Density 25/25° C. | Ref. index 25° C. | Unsaponifiable matter |
|---|---|---|---|---|
| | °C. | | | Percent |
| A | 130-140 | 0.9622 | 1.4507 | Nil |
| B | 190-200 | 0.9693 | 1.4678 | Nil |
| C | Over 200 | 0.9939 | 1.4740 | 8.62 |

Example 17

| | Parts by weight |
|---|---|
| Dipentene | 612 |
| n-Butanol | 500 |
| Fumaric acid | 348 |
| Stannic chloride-dioxanate | 16.2 |
| | 1476.2 |

This is reacted for 18.5 hours under the conditions described in Example 16, beginning at 120° C. and gradually increasing to 195° C. as the water of esterification is eliminated. When the reaction product is distilled at between 1-2 mm. (mercury) pressure, 115 parts of aqueous distillate is first given off and the following additional fractions are obtained.

| Fraction | Boiling range 1-2 mm. | Yield |
|---|---|---|
| | | Parts by weight |
| (a) | Less than 100° C. | 227 |
| (b) | 100-120° C | 60 |
| (c) | 120-150° C | 70 |
| (d) | 150-170° C | 110 |
| (e) | 170-190° C | 375 |
| (f) | 190-200° C | 321 |
| (g) | 200-205° C | 140 |
| (h) | Undistilled residue | 39 |
| | | 1,342 |

Redistillation of fractions b to g inclusive gives the following

| Fraction | Boiling range at 1 mm. | Yield |
|---|---|---|
| | | Parts by weight |
| 1 | Below 110° C | 15 |
| 2 | 110–113° C | 109 |
| 3 | 113–160° C | 119 |
| 4 | 160–170° C | 445 |
| 5 | 170–180° C | 246 |
| 6 | 180–185° C | 96 |
| 7 | Undistilled residue | 40 |
| | | 1,070 |

Fractions 4 to 6 inclusive were found on analysis to contain the terpene adducts, and the following constants were found.

| Fraction | Density 24°/15.5° C. | Refractive index 24° C. | Acid No. | Unsaponifiable matter |
|---|---|---|---|---|
| | | | | Per cent |
| 4 | 1.0056 | 1.4764 | 14.1 | 10.1 |
| 5 | 1.0069 | 1.4787 | 6.8 | 3.9 |
| 6 | 1.0050 | 1.4806 | 2.8 | 4.8 |

The stannic chloride-dioxanate catalyst used in this example is prepared by agitation of a mixture of 350 parts by weight of dioxane with 250 parts by weight of petroleum ether to which are slowly added 461 parts by weight of anhydrous stannic chloride in 100 parts of petroleum ether. The reaction is exothermic and should be kept below 30° C. by cooling. After the reaction has been effected the product crystallizes from solution upon cooling and is recovered as a white solid which is stable at room temperature in air. This product is particularly well suited as a catalyst for the purposes of this invention.

*Example 18*

| | Parts by weight |
|---|---|
| Beta pinene | 170 |
| Glycerol | 32 |
| Tri-ethylene glycol | 78 |
| Fumaric acid | 116 |
| Stannic chloride-dioxanate | 5 |

After 1¾ hours refluxing at 190° C. 58 parts by weight of uncombined terpene is removed by vacuum distillation and the resinuous product remaining is a plastic solid which is soluble in toluene.

Characteristic of the products of this invention is the substantial absence of esters of acids having a polybasicity greater than two, wherefore the viscosities and softening points tend to be lower than the maleic-terpene esters of the prior art. Fractionation of the butyl and amyl esters of the terpene-fumaric adducts of the present invention has also shown that far larger proportions of these are distillable than in the case of the butyl and amyl esters of the two stage maleic-terpene adducts. These differences may be attributable to the absence of such substantial amounts of polymeric acids as have been found to characterize the terpene-maleic adducts of the prior art.

By suitable regulation of the reaction conditions we may vary the combining ratio of terpene to fumaric acid and consequently of the proportion the various esters produced within considerable limits and by varying the solubilizing and reactive alcohols used we can produce a large number of new and useful derivatives.

The solubilizing and reactive alcohols suitable for the practice of this invention are those which contain non-acidic primary or secondary hydroxyl groups which are generally capable of esterification and which do not exceed the sum of two such hydroxyl groups per molecule. While mono and dihydric alcohols are chiefly employed it has been found possible also to employ multiple type compounds of an alcoholic nature such as the polyglycols, mono aryl or alkyl ethers of glycerol and the like. Glycerol and other of the more polyhydric alcohols may not, so far as is now known, be employed alone in an unmodified form since they appear to contain too many functional hydroxyl groups and tend to react with the fumaric acid to yield insoluble gels without effecting sufficient combination of the terpenes and hence are to be classed as non-solubilizing alcohols. However, in the presence of suitable proportions of solubilizing alcohols substantial amounts of the non-solubilizing alcohols may be used. Monohydric alcohols yield, in general, analogous but liquid esters of varying boiling range.

In operating our process we have found it advisable, although not essential, to employ sufficient excess of the terpene over the combining equivalent for the fumaric acid so that this excess of terpene, during its volatilization, may act mechanically and perhaps azeotropically to assist in the removal of the water of esterification and so promote the esterification reaction. When operating in this manner the reaction vessel is best equipped with some suitable means such as a side arm to which is attached a reflux condenser and a water trap so that the condensing vapors may be separated continuously, the water retained or separated and the excess terpene returned to the system until the desired degrees of addition reaction and of esterification have been attained.

In the operation of our process it is sometimes possible and advantageous to employ inert volatile diluents for the reaction mixture. Among materials suitable for this purpose may be mentioned benzene, toluene, xylene, ethylene dichloride or the like in place of an excess of terpene.

We have also found it possible to substitute a part of our terpenes with a corresponding amount of reactive non-terpene hydrocarbons and other volatile and polymerizable unsaturated bodies as for example styrene, dicyclopentadiene, cumarone and indene and certain vinyl, acrylic and methacrylic esters.

We have further found that in some cases it is desirable to add to the reaction mixture before, during, or after, the initial reaction, linseed fatty acids, linseed oil and the like.

In the operation of this process it has been found difficult to combine more than an average of ½ mole of terpene to each mole of fumaric acid unless a suitable catalyst be employed, although by the use of a large excess of terpene and by particular selection of the terpenes used it has been found possible to exceed this combining ratio. In general however when higher ratios of combined terpene are required we prefer to use a catalyst. Suitable catalysts are included in the group of the halogens, hydrogen halides or metallic halides and the use of such compounds is illustrated in some of the examples. Of the various substances which have been found to catalyze these reactions stannic chloride or stannic chloride-dioxanate are particularly suitable.

In the operation of our process we prefer in most cases to employ only the theoretical equivalent of alcohol based on the amount of fumaric acid used although the use of lesser or greater amounts is permissible. Particularly in the case of the esters of the monohydric alcohols is a departure from theoretical proportions and use of an excess of the alcohol beneficial.

Terpenes suitable for the purpose of this invention are limited to those of the $C_{10}H_{16}$ series which are of non-conjugated structure and among which alpha and beta pinenes, the limonenes, dipentene, and terpinolene are particularly suited. With both the mono- and di-hydroxy alcohol esters it is found possible to use gum turpentine or steam distilled wood turpentine in place of alpha pinene or of other non-conjugated terpenes with entirely satisfactory results. The use of turpentines or of other distillates rich in pinene is especially advantageous for economical reasons.

The products of this invention have been found to possess great utility. The liquid esters derived from the monohydric alcohols have been found suitable for use as plasticizers for nitrocellulose and in certain cases ethyl cellulose or of other cellulose esters or ethers. Our polyesters have also been found to be useful resins or resinous plasticizers for cellulose derivatives, particularly nitrocellulose. Many of the polyesters, with or without fatty acid or drying oil modification, have been found to be oxygen-convertible and of considerable utility in air-drying or in stoving paints, varnishes and enamels.

Certain of the products such as those prepared in accordance with Examples 7 and 8 have been found to yield superior binders for linoleum and related plastics. Products of the present invention are also useful for printing or lithographing inks, gaskets, cements or adhesives and for general coating or impregnating purposes.

Such other suitable changes and variations may be made in carrying out our process without departing from the spirit and scope of our invention and defined in the appended claims.

We claim:

1. A process for the production of ester condensation products which comprises heating a mixture containing fumaric acid and a non-conjugated terpene of the $C_{10}H_{16}$ series to reaction temperatures in admixture with a reactive solubilizing alcoholic compound selected from the group consisting of alcohols and ether alcohols having less than three esterifiable hydroxyl groups per molecule.

2. A process for the production of ester condensation products which comprises heating a mixture containing fumaric acid and a non-conjugated terpene of the $C_{10}H_{16}$ series to reaction temperatures in admixture with a reactive solubilizing alcoholic compound selected from the group consisting of alcohols and ether alcohols having less than three esterifiable hydroxyl groups per molecule, the temperature, time and other conditions of reaction being such as to bring about free and relatively continuous volatilization and removal of water of condensation in admixture with unreacted terpene.

3. A process for the production of ester condensation products which comprises heating a mixture containing fumaric acid and a non-conjugated terpene of the $C_{10}H_{16}$ series to reaction temperatures in admixture with a reactive solubilizing alcoholic compound selected from the group consisting of alcohols and ether alcohols having less than three esterifiable hydroxyl groups per molecule, the temperature, time and other conditions of reaction being such as to bring about free and relatively continuous volatilization and removal of water of condensation in admixture with unreacted terpene, separating the water from the admixture and returning the terpene to the reaction.

4. The process of claim 1 in which the alcoholic compound is selected from the group consisting of substantially water insoluble primary and secondary monohydric alcohols.

5. The process of claim 1 in which the alcoholic compound is an aliphatic glycol.

6. The process of claim 1 in which the alcoholic compound is a polyethylene glycol.

7. The process of claim 1 in which the reaction is carried out in the presence of an esterification catalyst selected from the group consisting of halogens, hydrogen halides and metal halides.

8. The simultaneous reaction product of fumaric acid, a non-conjugated terpene of the $C_{10}H_{16}$ series and an alcoholic compound selected from the group consisting of alcohols and ether alcohols containing less than three esterifiable hydroxyl groups.

9. The simultaneous reaction product of fumaric acid, a terpene distillate containing mainly pinene and an alcoholic compound selected from the group consisting of alcohols and ether alcohols which contains less than three esterifiable hydroxyl groups.

10. A process for the production of ester condensation puroducts which comprises heating a mixture containing fumaric acid, a terpene distillate containing mainly pinene, and an alcoholic compound selected from the group consisting of alcohols and ether alcohols which contains less than three esterifiable hydroxyl groups per molecule, said heating being continued at a temperature and for a time sufficient to bring about chemical combination of the mixture.

11. The simultaneous reaction product of fumaric acid, a pinene and a glycol.

THEODORE F. BRADLEY.
WILLIAM B. JOHNSTON.

CERTIFICATE OF CORRECTION.

Patent No. 2,235,447. March 18, 1941.

THEODORE F. BRADLEY, ET AL.

It is hereby certified that error appears in the printed specification of the above numbered patent requiring correction as follows: Page 2, second column, line 23, after the word "bromide" insert --and--; page 3, second column, line 32, in the equation, for "35 parts" read --33 parts--; page 5, second column, line 47, claim 10, for "puroducts" read --products--; and that the said Letters Patent should be read with this correction therein that the same may conform to the record of the case in the Patent Office.

Signed and sealed this 22nd day of April, A. D. 1941.

(Seal)

Henry Van Arsdale,
Acting Commissioner of Patents.